US012693021B2

(12) United States Patent (10) Patent No.: US 12,693,021 B2
Snyder et al. (45) Date of Patent: Jul. 28, 2026

(54) INTEGRATED COMBUSTOR LINER SHAFT FUEL INJECTION

(71) Applicant: RTX Corporation, Farmington, CT (US)

(72) Inventors: Timothy Snyder, Glastonbury, CT (US); Lawrence Binek, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/201,188

(22) Filed: May 7, 2025

(65) Prior Publication Data

US 2025/0347418 A1 Nov. 13, 2025

Related U.S. Application Data

(60) Provisional application No. 63/645,534, filed on May 10, 2024.

(51) Int. Cl.
*F23R 3/38* (2006.01)
*F02C 7/18* (2006.01)
(Continued)

(52) U.S. Cl.
CPC .................. *F23R 3/52* (2013.01); *F02C 7/18* (2013.01); *F23R 3/286* (2013.01); *F23R 3/38* (2013.01); *F23R 2900/03043* (2013.01)

(58) Field of Classification Search
CPC ...... F23R 3/38; F23R 3/52; F02C 3/05; F02C 3/08–09
See application file for complete search history.

(56) References Cited

U.S. PATENT DOCUMENTS 1,941,141 A 12/1933 Roth
2,609,663 A 9/1952 Newcomb
(Continued)

FOREIGN PATENT DOCUMENTS

AU 2019264621 A1 6/2020
CN 101506474 B 7/2012
(Continued)

OTHER PUBLICATIONS

Extended European Search Report dated Sep. 19, 2025, for corresponding European Patent Application No. 25175857.9-1002, 8 pgs.

(Continued)

*Primary Examiner* — Devon C Kramer
*Assistant Examiner* — Marc Amar
(74) *Attorney, Agent, or Firm* — Kinney & Lange, P.A.

(57) ABSTRACT

A gas turbine engine includes a compressor configured to receive inlet air at a compressor inlet and generate compressed air at a compressor exit, a combustor positioned fluidically and physically downstream of the compressor, a turbine positioned fluidically and physically downstream of the combustor, and a shaft mechanically connecting the turbine and the compressor. The combustor is fluidically connected to the compressor to receive a first portion of the compressed air as combustor primary inlet air. The combustor includes a toroidal recirculation zone configured to receive and combust fuel in a rich combustion zone, an ignitor positioned to ignite an air/fuel mixture in the rich combustion zone, a rapid quench zone downstream of the toroidal recirculation zone, a lean combustion zone downstream of the rapid quench zone, and a cooling air flow path configured to direct a second portion of the compressed air around an outer combustor liner.

12 Claims, 11 Drawing Sheets

(51) Int. Cl.
  *F23R 3/28*     (2006.01)
  *F23R 3/52*     (2006.01)

(56)        References Cited

U.S. PATENT DOCUMENTS

| | | | | | |
|---|---|---|---|---|---|
| 2,823,519 | A | * | 2/1958 | Spalding | F23R 3/20 |
| | | | | | 60/749 |
| 3,034,298 | A | * | 5/1962 | White | F02C 7/18 |
| | | | | | 415/176 |
| 3,099,134 | A | | 7/1963 | Henry et al. | |
| 3,407,596 | A | * | 10/1968 | Dasbach | F23R 3/30 |
| | | | | | 60/737 |
| 3,618,777 | A | * | 11/1971 | Meyer | B67D 7/08 |
| | | | | | 210/90 |
| 3,734,639 | A | * | 5/1973 | Short | F02C 7/12 |
| | | | | | 416/193 A |
| 4,007,002 | A | * | 2/1977 | Schirmer | F23C 7/008 |
| | | | | | 60/39.23 |
| 4,040,251 | A | | 8/1977 | Heitmann et al. | |
| 4,232,526 | A | | 11/1980 | Barbeau | |
| 4,265,615 | A | | 5/1981 | Lohmann et al. | |
| 4,301,656 | A | * | 11/1981 | Stettler | F02C 7/264 |
| | | | | | 60/737 |
| 4,373,325 | A | * | 2/1983 | Shekleton | F23R 3/02 |
| | | | | | 60/737 |
| 4,845,940 | A | * | 7/1989 | Beer | F23R 3/12 |
| | | | | | 60/757 |
| 4,928,479 | A | | 5/1990 | Shekleton et al. | |
| 4,996,838 | A | | 3/1991 | Melconian | |
| 5,025,622 | A | | 6/1991 | Melconian | |
| 5,069,033 | A | | 12/1991 | Shekleton | |
| 5,163,285 | A | | 11/1992 | Mazeaud et al. | |
| 5,209,066 | A | | 5/1993 | Barbier et al. | |
| 5,303,543 | A | | 4/1994 | Shah et al. | |
| 5,727,378 | A | | 3/1998 | Seymour | |
| 5,899,058 | A | | 5/1999 | Narcus et al. | |
| 6,065,282 | A | | 5/2000 | Fukue et al. | |
| 6,148,617 | A | | 11/2000 | Williams | |
| 6,250,061 | B1 | | 6/2001 | Orlando | |
| 6,408,629 | B1 | | 6/2002 | Harris et al. | |
| 6,931,862 | B2 | | 8/2005 | Harris | |
| 7,303,372 | B2 | | 12/2007 | West et al. | |
| 7,568,343 | B2 | | 8/2009 | Harris et al. | |
| 7,685,822 | B1 | | 3/2010 | Harris | |
| 7,937,946 | B1 | * | 5/2011 | Harris | F02C 7/224 |
| | | | | | 60/39.08 |
| 8,479,492 | B2 | | 7/2013 | Patel et al. | |
| 8,640,464 | B2 | | 2/2014 | Condevaux et al. | |
| 9,400,110 | B2 | | 7/2016 | Dudebout et al. | |
| 9,528,705 | B2 | | 12/2016 | Melton | |
| 9,631,814 | B1 | | 4/2017 | Barton et al. | |

| | | | | | |
|---|---|---|---|---|---|
| 10,807,163 | B2 | | 10/2020 | Ott et al. | |
| 10,808,934 | B2 | | 10/2020 | Boardman et al. | |
| 10,823,422 | B2 | | 11/2020 | Johnson et al. | |
| 10,907,834 | B2 | | 2/2021 | Park | |
| 10,976,052 | B2 | | 4/2021 | Boardman et al. | |
| 10,976,053 | B2 | | 4/2021 | Boardman et al. | |
| 11,073,286 | B2 | | 7/2021 | Boardman et al. | |
| 11,181,269 | B2 | | 11/2021 | Boardman et al. | |
| 11,828,469 | B2 | | 11/2023 | Overman et al. | |
| 12,298,009 | B1 | | 5/2025 | Yu et al. | |
| 2007/0234733 | A1 | * | 10/2007 | Harris | F23R 3/38 |
| | | | | | 60/776 |
| 2009/0241506 | A1 | * | 10/2009 | Nilsson | F23N 5/006 |
| | | | | | 60/39.24 |
| 2010/0205972 | A1 | | 8/2010 | Chila et al. | |
| 2012/0034647 | A1 | | 2/2012 | Herzog et al. | |
| 2012/0304647 | A1 | | 12/2012 | Dudebout et al. | |
| 2014/0110092 | A1 | * | 4/2014 | John | F02C 3/30 |
| | | | | | 165/138 |
| 2014/0193274 | A1 | | 7/2014 | Thompson et al. | |
| 2014/0366542 | A1 | | 12/2014 | Teets | |
| 2016/0040885 | A1 | | 2/2016 | Gao et al. | |
| 2019/0162188 | A1 | | 5/2019 | Sung | |
| 2021/0199300 | A1 | * | 7/2021 | Berry | B01F 25/31242 |
| 2021/0252596 | A1 | | 8/2021 | Sale et al. | |
| 2022/0290861 | A1 | | 9/2022 | Chiranthan et al. | |
| 2024/0151150 | A1 | | 5/2024 | Beck et al. | |
| 2024/0401807 | A1 | | 12/2024 | Nath et al. | |

FOREIGN PATENT DOCUMENTS

| | | | | | |
|---|---|---|---|---|---|
| CN | 107725190 | B | | 10/2019 | |
| EP | 0529310 | A1 | | 3/1993 | |
| FR | 3061948 | A1 | | 7/2018 | |
| GB | 609926 | A | * | 10/1948 | F02C 7/18 |
| JP | 2014169828 | A | | 9/2014 | |
| JP | 6025616 | B2 | | 10/2016 | |

OTHER PUBLICATIONS

Extended European Search Report dated Sep. 19, 2025, for corresponding European Patent Application No. 25175862.9-1002, 10 pgs.
Extended European Search Report for European Patent Application No. 25175723.3, dated Aug. 11, 2025, 9 pages.
Non-Final Office Action dated Sep. 16, 2025, for corresponding U.S. Appl. No. 19/201,164, 59 pgs.
Notice of Allowance and Fee(s) Due dated Oct. 17, 2025, for corresponding U.S. Appl. No. 19/201,178, 18 pgs.
Extended European Search Report for EP Application No. 25195781.7-1002 dated Dec. 18, 2025, 7 pages.

* cited by examiner

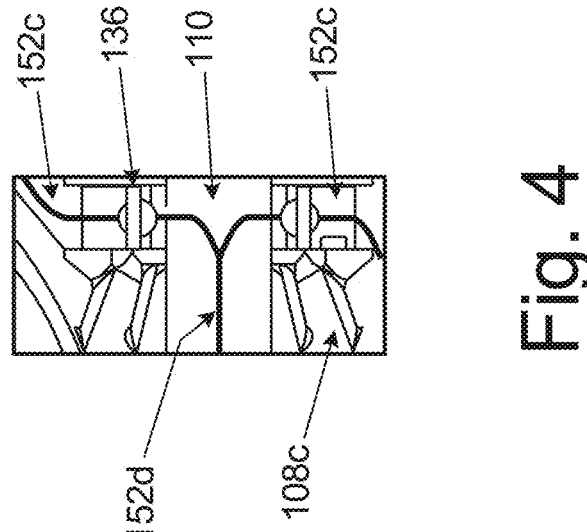
Fig. 4
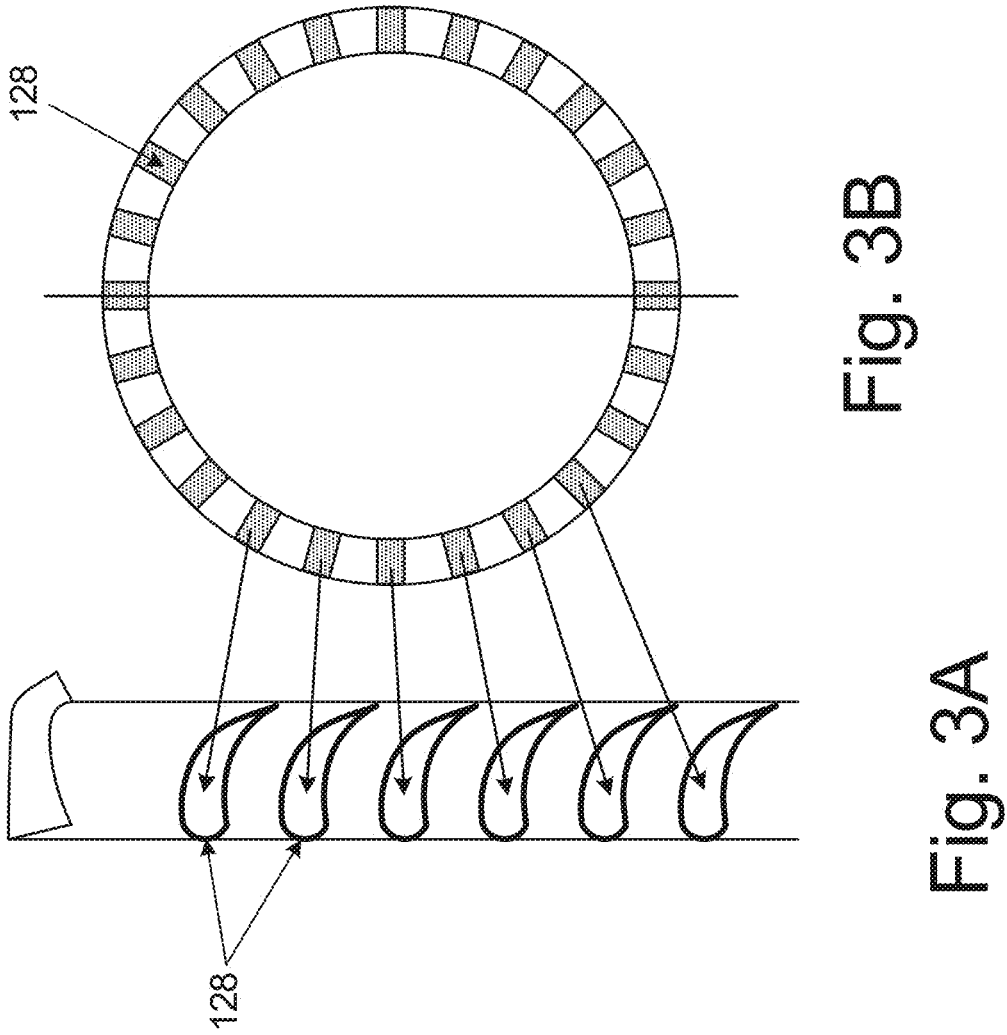
Fig. 3B
Fig. 3A

Compressor — Prediffuser — Turbine Wheel — Deswirl — Shaft Pump — Comb Inlet

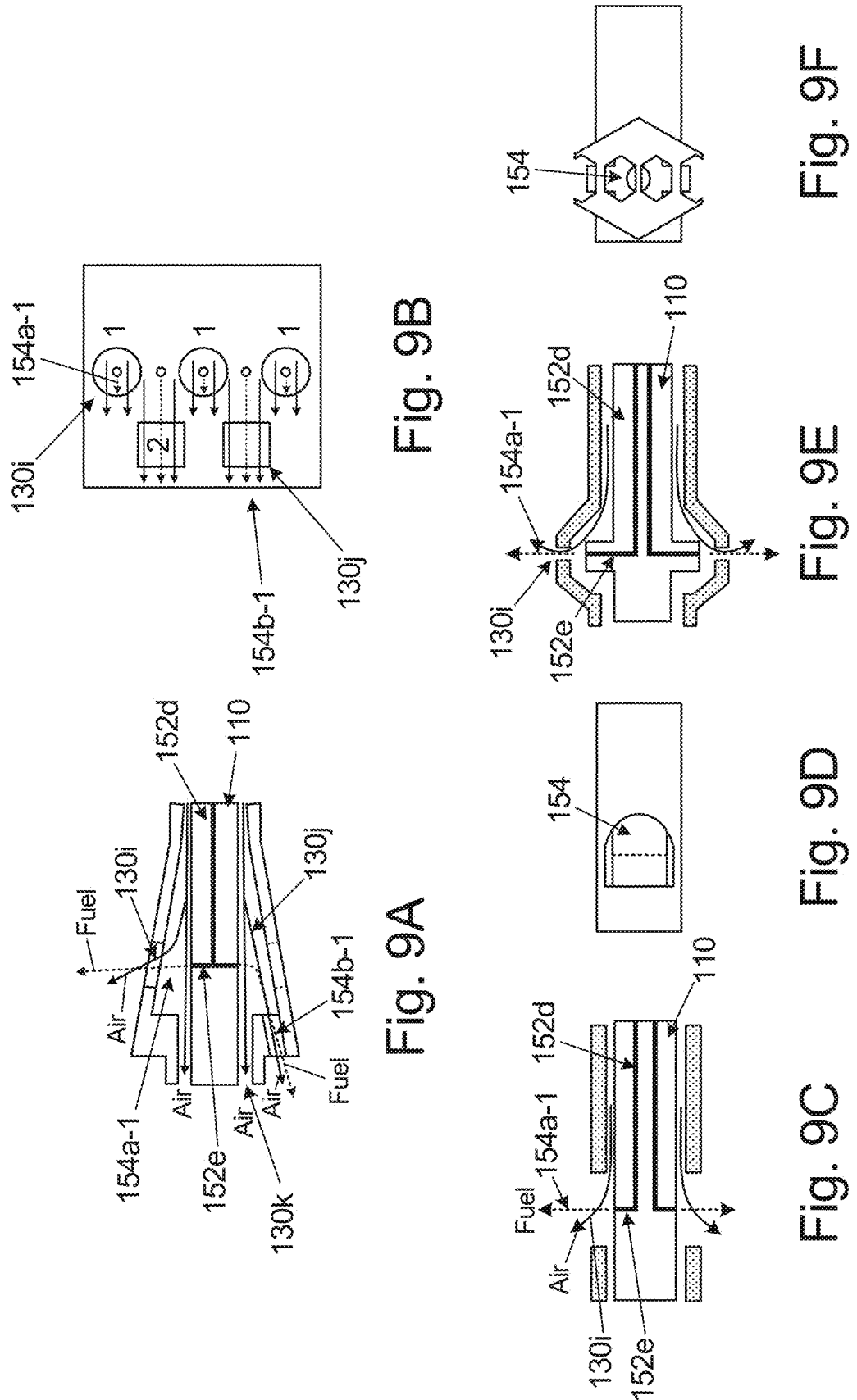

INTEGRATED COMBUSTOR LINER SHAFT FUEL INJECTION

CROSS-REFERENCE TO RELATED APPLICATION(S)

This application claims the benefit of U.S. Provisional Application No. 63/645,534, filed May 10, 2024, and entitled "INTEGRATED COMBUSTOR LINER SHAFT FUEL INJECTION," the disclosure of which is hereby incorporated by reference in its entirety.

The present disclosure relates generally to a gas turbine engine combustor and, more particularly, a gas turbine engine combustor with integral features that are suitable for construction using additive manufacturing processes.

For certain small gas turbine engines, it is desirable to improve designs to provide lower cost, smaller size, high altitude relight capability, improved operability and lean blow out (i.e., flame stability) characteristics, and enhanced operational life. In addition, thoughtful design can ensure that key portions of such gas turbine engines can be made using additive manufacturing processes.

SUMMARY

One aspect of this disclosure is directed to a gas turbine engine including a compressor configured to receive inlet air at a compressor inlet and generate compressed air at a compressor exit, a combustor positioned fluidically and physically downstream of the compressor, a turbine positioned fluidically and physically downstream of the combustor, and a shaft mechanically connecting the turbine and the compressor. The combustor is fluidically connected to the compressor to receive a first portion of the compressed air as combustor primary inlet air. The combustor includes a toroidal recirculation zone configured to receive and combust fuel in a rich combustion zone, an ignitor positioned to ignite an air/fuel mixture in the rich combustion zone, a rapid quench zone downstream of the toroidal recirculation zone, a lean combustion zone downstream of the rapid quench zone, and a cooling air flow path configured to direct a second portion of the compressed air around an outer combustor liner to cool the combustor liner and to provide a source of quench air, inner combustor liner cooling air, fuel injector air, and combustor secondary inlet air. The rapid quench zone, which includes an array of quench tubes, is configured to receive and quench with quench air combustion products from the rich combustion zone. The lean combustion zone is configured to complete combustion of the fuel and to generate hot combustor exhaust gas. The turbine is fluidically connected to the compressor to receive the hot combustor exhaust gas. The shaft, which connects the turbine to the compressor through an annulus formed by the combustor surrounding the shaft, is configured to transmit rotational energy from the turbine to the compressor to power the compressor pump fuel from a fuel source to the combustor through a fuel duct in the shaft. A shaft cooling air pump is configured to further compress and accelerate the second portion of the compressed air before the second portion of the compressed air enters the combustor as fuel injector air and combustor secondary inlet air. The toroidal recirculation zone further comprises a plurality of fuel injectors configured to mix fuel from the fuel duct in the shaft and fuel injector air from the shaft cooling air pump and to direct the fuel and the fuel injector air mixture into the rich combustion zone.

Another aspect of this disclosure is directed to a method of directing fuel to a combustor in a gas turbine engine that includes rotating a shaft configured to mechanically connecting a turbine and a compressor to transmit rotational energy from the turbine to the compressor to power the compressor and pump fuel from a fuel source to the combustor through a fuel duct in the shaft. Fuel from the fuel duct is directed to a plurality of fuel injectors configured to mix the fuel from the fuel duct in the shaft and fuel injector air from a shaft cooling air pump. The fuel and the fuel injector air mixture is directed into a rich combustion zone of the combustor. The shaft connects the turbine to the compressor through an annulus formed by a combustor surrounding the shaft. The combustor further includes an ignitor positioned to ignite an air/fuel mixture in the rich combustion zone, a rapid quench zone downstream of the rich combustion zone, and a lean combustion zone downstream of the rapid quench zone. The rapid quench zone is configured to receive and quench with quench air combustion products from the rich combustion zone. The lean combustion zone is configured to complete combustion of the fuel and to generate hot combustor exhaust gas.

BRIEF DESCRIPTION OF THE DRAWINGS

FIG. 3A is a schematic view of the hollow cooled $1^{st}$ stage turbine vane cross section.

FIG. 3B is a schematic view of the hollow cooled $1^{st}$ stage turbine vanes.

FIG. 4 is a schematic view of a fuel-cooled aft bearing.

FIG. 9A is a schematic view a primary fuel flow (directed to combustor liner wall opposite fuel injector) and secondary fuel flow (directed to combustor liner wall adjacent to fuel injector).

FIG. 9B is an overhead view of the fuel injection system of FIG. 8A.

FIG. 9C is a schematic of one alternate configuration for the primary fuel flow of FIG. 8A.

FIG. 9D is an overhead view of the fuel injection system of FIG. 9C.

FIG. 9E is a schematic of another alternate configuration for the primary fuel flow of FIG. 8A.

FIG. 9F is an overhead view of the fuel injection system of FIG. 9E.

DETAILED DESCRIPTION

Small gas turbine engines are useful for a number of applications for which small size, high altitude relight capability, improved operability and lean blow out characteristics, and good operational life are desirable. In addition, it is often desirable that significant portions of such gas turbine engines can be made using additive manufacturing processes. Some previous small gas turbine engine designs were challenged by combustor designs that resulted in limited height recirculation zones, leading to limitations in altitude relight capabilities; reverse flow designs that resulted in hot exhaust combustor exhaust gases being cooled by combustor inlet air, thereby decreasing the energy available to recover in the turbine; fuel injection systems that rely on a pump and manifold for effective fuel distribution, resulting in a combustor package that was larger than desired; and ignitor positioning that resulted in a combustor that was undesirably long. The gas turbine engine, and particularly the combustor for the gas turbine engine, that is the subject of this disclosure includes features that address each of the shortcomings of previous small gas turbine engine designs.

Figure 1:
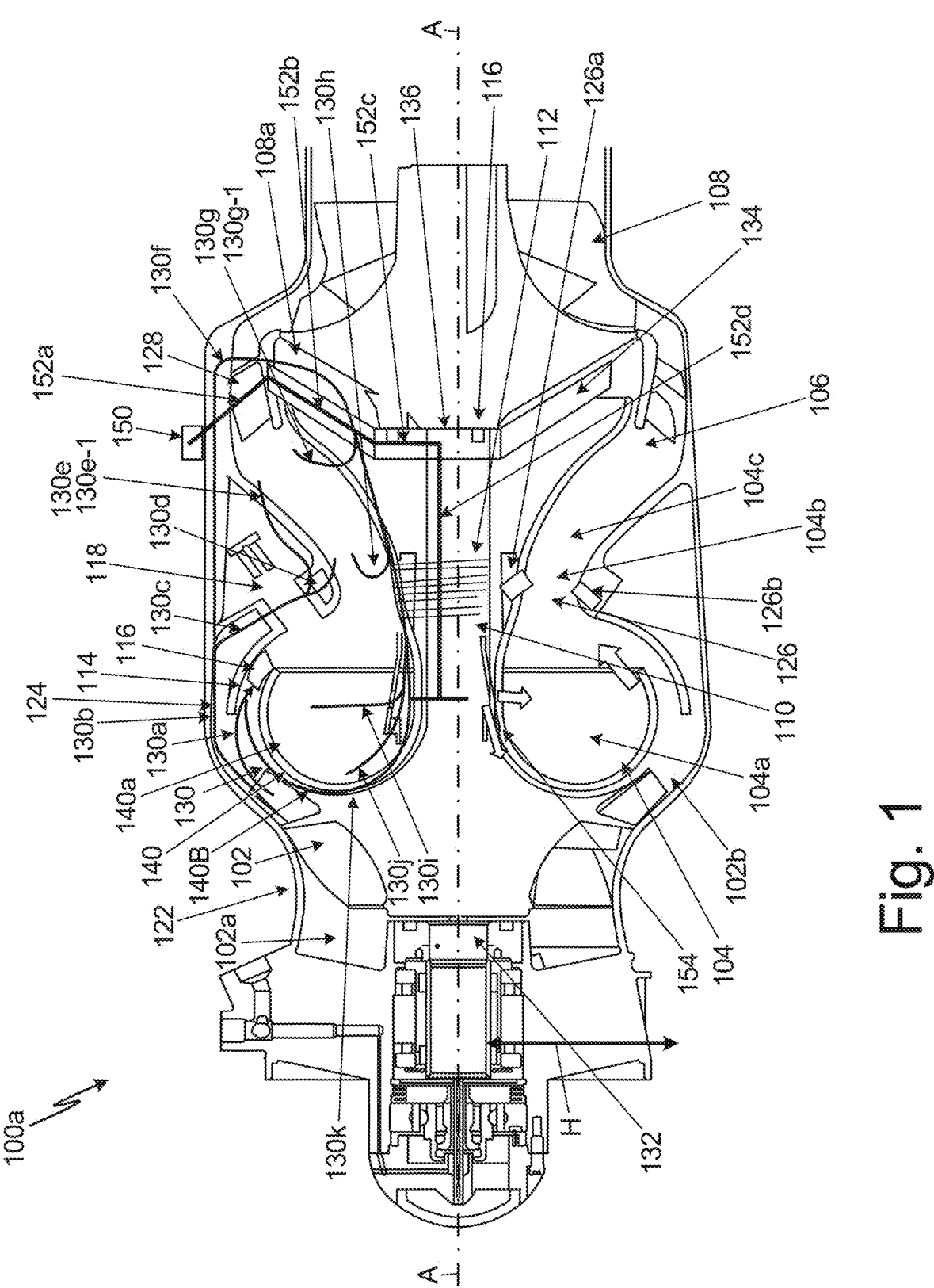
FIG. 1 is a cross section of an exemplary engine of the present disclosure.

Referring to FIG. 1, a gas turbine engine 100a of this disclosure includes a compressor 102 configured to receive inlet air at compressor inlet 102a and to generate compressed air 130 at an exit 102b of the compressor 102. A combustor 104 is fluidically connected to the compressor 102 to receive a first portion of the compressed air 130 as combustor primary inlet air 130a. The combustor 104 is positioned downstream of the compressor 102 both fluidically (i.e., compressed air flows from the compressor 102 to the combustor 104) and spatially (i.e., the combustor 104 is positioned physically downstream of the compressor 102 along an axis of rotation A). A turbine 108 is fluidically connected to the combustor 104 to receive hot combustor exhaust gas 106 from the combustor 104. The turbine 108 is positioned downstream of the combustor 104 both fluidically (i.e., hot combustor exhaust gas flows from the combustor 104 to the turbine 108) and spatially (i.e., the turbine 108 is positioned physically downstream of the combustor 104 along the axis of rotation A). Positioning the turbine 108 downstream of the combustor 104 separates the hot combustor exhaust gas 106 from compressed air 130 exiting the compressor 102, avoiding unwanted heat exchange between the hot combustor exhaust gas 106 and compressed air 130 that can occur in some prior designs. A shaft 110 mechanically connects the turbine 108 to the compressor 102 and transmits rotational energy from the turbine 108 to the compressor 102 to drive the compressor 102. Shaft 110 is supported by front bearing 132 and aft bearing 136, which surrounds the shaft immediately upstream of the turbine 108, and support the shaft 110 when it rotates in operation. As discussed in more detail below, the shaft 110 is further configured to pump fuel from a fuel source 150 and to direct the fuel to the combustor 104 through a fuel duct 152a-e in the shaft 110 and to further pressurize a portion of the compressor air through a shaft cooling air pump 112 before the second portion of the compressed air enters the combustor 104 as quench air 130d, 130h, fuel injector air 130i, 130j, and combustor secondary inlet air 130k.

While FIG. 1 depicts the compressor 102 as a centrifugal compressor and turbine 108 as a centrifugal turbine, a person of ordinary skill will recognize that an axial compressor and/or an axial turbine could be useful for certain applications. In the example of FIG. 1, the centrifugal compressor 102 and centrifugal turbine 108 were selected to provide the desired packaging (e.g., compact size, etc.) for the gas turbine engine 100a.

FIG. 1 further shows that the combustor 104 includes a rich combustion zone 104a configured as a toroidal recirculation zone to combust fuel with an air/fuel ratio less than 1; a rapid quench zone 104b fluidically downstream of the rich combustion zone 104a that is configured to receive and quench with quench air 130d, 130h combustion products (i.e., unburned fuel, carbon monoxide (CO) and other combustion product) from the rich combustion zone 104a; and a lean combustion zone 104c downstream of the rapid quench zone 104b. The lean combustion zone 104c is configured as a bulk swirl zone to complete combustion of the fuel with an air/fuel ratio greater than 1 and to generate hot combustor exhaust gases 106 that are directed to the turbine 108.

Figure 2A:
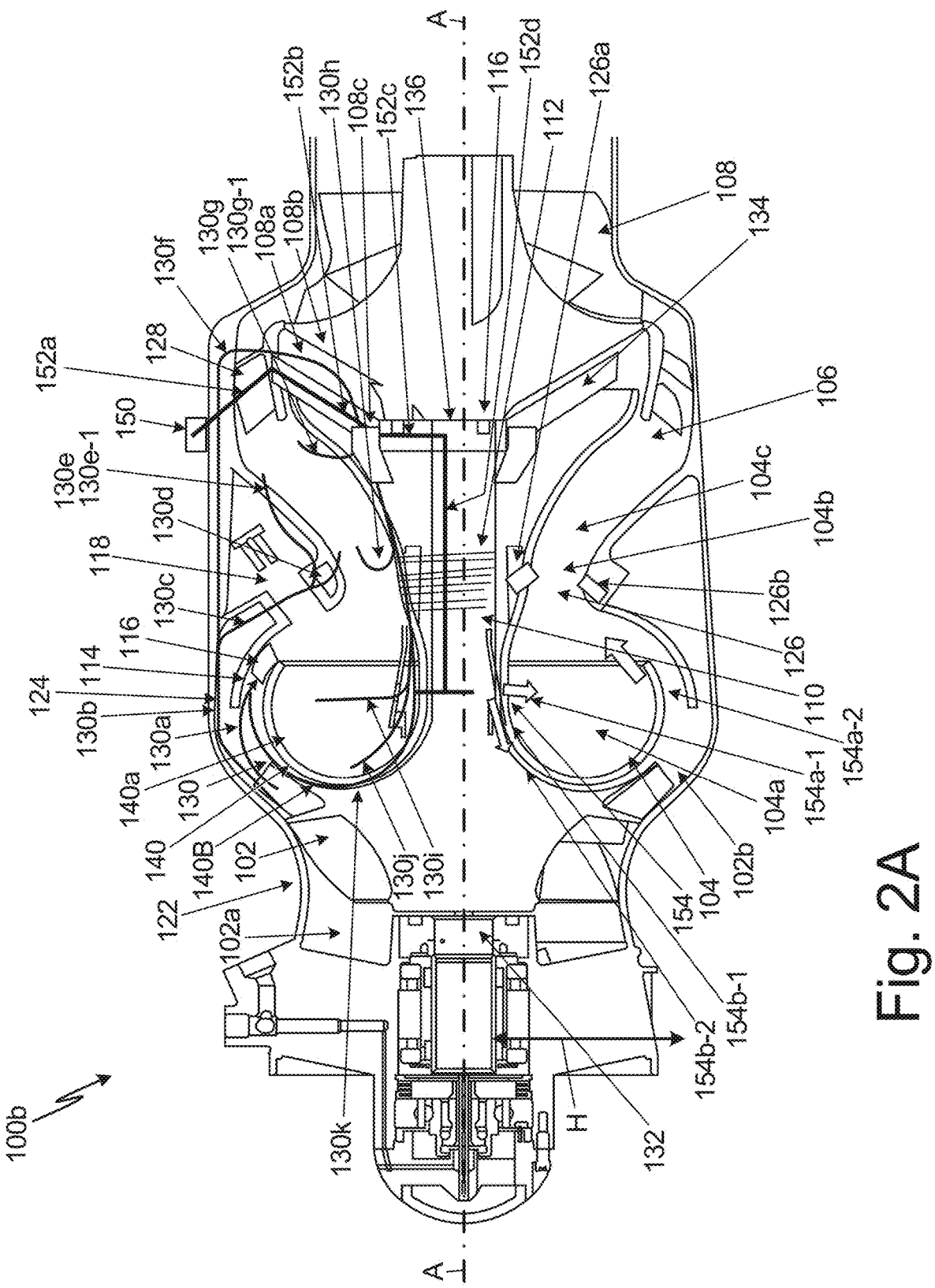
FIG. 2A is a cross section of another exemplary engine of the present disclosure.
Figure 2B:
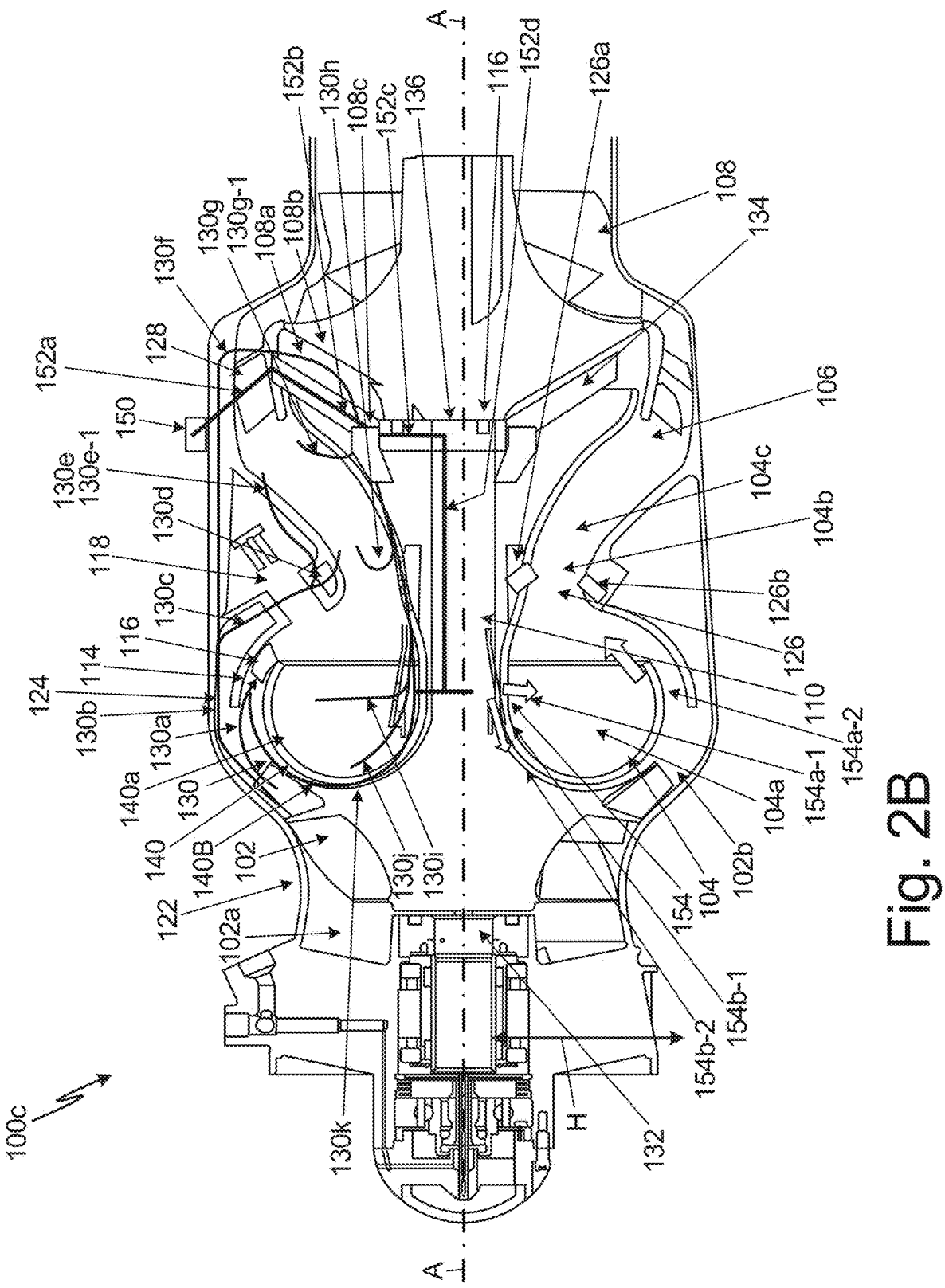
FIG. 2B is a cross section of yet another exemplary engine of the present disclosure.

As mentioned above, the rich combustion zone 104a is configured as a toroidal recirculation zone with circulation provided air entering the combustor inlet 114 as combustor primary inlet air 130a and combustor secondary inlet air 130k and air entering the fuel injector 154 (as described in more detail below) as primary fuel injector air 130i and secondary fuel injector air 130j. The flow of combustor primary inlet air 130a, combustor secondary inlet air 130k, primary fuel injector air 130i, and secondary fuel injector air 130j into the rich combustion zone 104a creates a bulk swirl in an axial plane that can manifest itself as a counterclockwise rotation. Combustor primary inlet air 130a and combustor secondary inlet air 130k mix and are directed across combustor inlet deswirl vanes 116 that are configured to straighten airflow into the combustor and secondarily to provide structural support for the combustor liner 140 in the rich combustion zone 104a. The combustor inlet deswirl vanes 116 can further be configured as bluff bodies to create a quiescent flow zone downstream of the combustor inlet deswirl vanes 116 to support flame stability and desirable altitude relight and lean blow out characteristics as the air/fuel mixture in the rich combustion zone 104a flows toward ignitor 118. As shown in FIG. 1, the combustor inlet deswirl vanes 116 are positioned immediately upstream of ignitor 118 and provide a good environment for fuel ignition and sustained combustion. The ignitor 118 can be a spark ignitor or any other type of gas turbine engine ignitor that is deemed appropriate for the application. The ignitor 118 should be designed to provide ignition of a rich air/fuel mixture in the rich combustion zone 104a at all design conditions, including ground level and altitude conditions. As shown in FIGS. 1, 2A and 2B, positioning the ignitor 118 is immediately downstream of the combustor inlet deswirl vanes 116 and above the quench zone inlet 126 permits the ignitor 118 to be packaged tightly within the combustor envelope to provide a combustor 104 much shorter than is typically the case with older designs that have an ignitor that extends lengthwise from the combustor.

To support flame stability and desired altitude relight and lean blow out characteristics, the rich combustion zone 104a is configured with a relatively large toroidal recirculation zone height H (i.e., the distance between the combustor inlet 114 and the fuel injector 154 to provide a desired (e.g., maximized or other appropriate) flow residence time in the rich combustion zone 104a. For example, the toroidal recirculation zone height H can be roughly the height of the compressor inlet 102a. Further the relatively large toroidal recirculation zone height H combined with airflow 130a, 130i, 130j, 130k into the rich combustion zone 104a creates a bulk swirl in an axial plane of the rich combustion zone 104a.

Combustion products exit the rich combustion zone 104a through quench zone inlet 126 where they mix rapidly with outer diameter (OD) quench air 130d and inner diameter (ID) quench air 130h that enter the quench zone 104b through ID quench tubes 126a and OD quench tubes 126b. Quench zone inlet 126 is configured as a converging nozzle to accelerate unburned fuel and rich combustion zone 104a products into the quench zone to promote mixing with the quench air 130c, 130h. The orientation of the quench tubes, which can be 45°, create a bulk swirl in a circumferential plane that also promotes rapid mixing of rich combustion zone 104a products with the quench air 130d, 130h. The mixture of unburned fuel, rich combustion zone 104a products, and quench air 130c, 130h exits the quench zone 104b and enters the lean combustion zone 104c where OD combustor liner cooling air 130e and ID combustor liner cooling air 130g is added through a plurality of OD aft combustor liner cooling air trim holes 130e-1 and a plurality of ID aft combustor liner cooling air trim holes 130g-1 to create lean combustion conditions (i.e., air/fuel ratio greater then 1) to complete combustion. The bulk circumferential swirl generated in the quench zone 104b continues through the lean combustion zone 104c to provide thorough mixing of unburned fuel, rich combustion zone 104a products, and air streams 130d, 130e, 130g, and 130h. Combustor exhaust gas 106 exits the combustor 104 by flowing across a plurality of hollow 1st stage turbine vanes 128 positioned between the combustor 104 and the turbine 108 to remove the bulk circumferential swirl created in the lean combustion zone 104c before the combustor exhaust gas 106 enters the turbine 108. The plurality of hollow 1st stage turbine vanes 128 are further configured to provide structural support for the combustor liner 140 in the lean combustion zone 104c. FIGS. 3a and 3b show more detailed views of the hollow 1st stage turbine vanes 128.

FIGS. 2A and 2B, which will be described with FIG. 1, shows airflow through gas turbine engine 100b. Gas turbine engine 100b is very similar to gas turbine engine 100a shown in FIG. 1 with the addition of a turbine wheel compression stage 108b and turbine wheel deswirl vanes 108c, both of which are discussed later in this disclosure. As discussed above, compressed air 130 exits the compressor 102 at the compressor exit 102b is divided into a combustor primary air stream 130a, which enters the combustor 104 at the combustor inlet 114, and a second portion 130b of compressed air, which enters cooling air flow path 124 becomes the source of all of the further airflows described below. Cooling air flow path 124 follows the exterior 140b of the combustor liner 140 (i.e., the outer combustor liner wall 140b) to cool the combustor liner 140, which defines the perimeter of the combustor 104, and supply the airflows described below, essentially creating a 360° cooling loop surround the combustor liner 140. The inner combustor liner wall 140a defines the inner perimeter of the combustor 104 that is exposed to combustion. The outer combustor liner wall 140b defines the outer perimeter of the combustor 104 that is exposed to cooling air.

A portion of the second portion 130b of compressed air becomes OD air 130c, which splits into the OD quench air 130d and OD combustor liner cooling air 130e. The OD quench air 130d enters the quench zone 104b through OD quench tubes 126b, which are described in more detail below. The OD combustor liner cooling air 130e enters the lean combustion zone 104c downstream of the OD quench tubes 126b to provide cooling and supplemental combustion air in the lean combustion zone 104c. The OD combustor liner cooling air 130e can be configured to enter the lean combustion zone 104c through film cooling holes (not shown) or any other feature that can create a layer of air attached to the inner combustor liner wall 140a of the lean combustion zone 104c to provide effective cooling and/or larger sized film cooling holes to tailor a radial temperature profile going in the hollow 1st stage turbine vanes 128. The remaining amount of the second portion 130b of compressed air flows around the combustor 104 as ID air 130f to provide cooling and combustion air to other portions of the combustor 104.

ID air 130f first flows through the hollow 1st stage turbine vanes 128 to provide cooling and then into a turbine air plenum 108a positioned between the turbine 108 and the combustor 104. In the example of gas turbine engine 100a (FIG. 1), the ID air 130f then splits into ID combustor liner cooling air 130g and ID quench air 130h with the remaining ID air 130f continuing through shaft cooling air pump 112. In the example of gas turbine engine 100b (FIG. 2A), the ID air 130f is further compressed by turbine wheel compression stage 108b after which it flows through turbine wheel deswirl vanes 108c before splitting into ID combustor liner cooling air 130g and ID quench air 130h. As with gas turbine engine 100a, the remaining ID air 130f continues through shaft cooling air pump 112. In both examples, ID combustor liner cooling air 130g enters the lean combustion zone 104c downstream of the ID quench tubes 126b to provide cooling and supplemental combustion air in the lean combustion zone 104c. As with the OD combustor liner cooling air 130e, ID combustor liner cooling air 130g can be configured to enter the lean combustion zone 104c through film cooling holes (not shown) or any other feature that can create a layer of air attached to the inner combustor liner wall 140a of the lean combustion zone 104c to provide effective cooling and/or larger sized film cooling holes to tailor a radial temperature profile going in the hollow 1st stage turbine vanes 128. ID quench air 130h enters the quench zone 104b through ID quench tubes 126a, which are described in more detail below. Shaft cooling air pump 112, turbine wheel compression stage 108b, and turbine wheel deswirl vanes 108c are also described in more detail below.

Cooling air exiting the shaft cooling air pump 112 ultimately splits into three streams: primary fuel injector air 130i, secondary fuel injector air 130k, and combustor secondary inlet air 130k. As described further below, both primary fuel injector air 130i and secondary fuel injector air 130$k$ mix with fuel in fuel injector 154 and enter rich combustion zone 104$a$. The combustor secondary inlet air 130$k$ flows around the outside of rich combustion zone 104$a$ liner to provide cooling before mixing with combustor primary inlet air 103$a$ across the combustor inlet deswirl vanes 116 at the combustor inlet 114. The distribution of compressed air 130 across each of the stream described here depend on the requirements of each specific application. In one example, the distribution of compressed air 130 can be as shown in the following table. A person of ordinary skill will recognize that many other distributions of compressed air 130 are possible.

| Table of Air Streams | |
| --- | --- |
| Air Stream | Percentage of Total Compressed Air 130 |
| Combustor primary air 130a | 10 |
| Second portion 130b of compressed air | 90 |
| OD air 130c | 25 |
| OD quench air 130d | 20 |
| OD combustor liner cooling air 130e | 5 |
| ID air 130f | 65 |
| ID combustor liner cooling air 130g | 5 |
| ID quench air 130h | 20 |
| Primary fuel injector air 130i + Secondary fuel injector air 130j | 15 |
| Combustor secondary inlet air 130k | 5 |
| Compressed air 130 | 100 |

Circulating cooling air about the combustor 102 as described above and facilitated by the shaft cooling air pump 112 provides cooling to all relevant portions of the combustor 102, permitting the combustor 102 to operate at desired temperatures while maintaining a desired operational life. Moreover, using cooling air to cool the hollow 1$^{st}$ stage turbine vanes 128, permits the combustor 102 to operate with a higher exhaust temperature than would be the case without cooling the 1$^{st}$ stage turbine vanes. The higher combustor exhaust gas 106 temperature enhances energy available for recovery in the turbine 108 and for use as propulsion.

FIG. 2A also shows fuel flow through gas turbine engine 100$b$ (which applies equally to gas turbine engine 100$a$ in FIG. 1) Fuel flows from fuel source 150 through a series of fuel ducts 152$a$-$e$ toward a plurality of fuel injectors 154, providing cooling along the way. First, fuel flow through fuel duct 152$a$ to hollow strut 134, which provide structural support for the shaft 110 and aft bearing 136 on top of hollow 1$^{st}$ stage turbine vanes 128. Being positioned in a hot portion of gas turbine engine 100$b$ (or 100$a$) downstream of the combustor 104, both the hollow strut 134 and aft bearing 136 require cooling to retain structural integrity and to function as desired. A person of ordinary skill will recognize that the hollow strut 134 and aft bearing 136 can be of any design that will allow them to support shaft 110 as it rotates in operation. Fuel can be supplied to the shaft 110 through one or more of the hollow struts 134 in fuel channel 152$b$, which can be part of the structure of hollow strut 134 and can be insulated to prevent coking within the hollow 1$^{st}$ stage turbine vanes 128. Inner diameter air 130$f$ also provides cooling to the hollow struts 134. As shown in more detail in FIG. 4, fuel exiting the hollow strut 134 flows through fuel channel 152$c$ to and through aft bearing 136 to provide the required cooling. Fuel exiting aft bearing 136 enters fuel channel 152$d$, which runs through shaft 110. As described further below, rotation of shaft 110 provides pumping action to pull fuel from fuel source 150, through fuel ducts 152$a$-$d$ and into fuel duct 152$e$. Fuel from fuel duct 152$e$ flows into fuel injector 154 where it then enters rich combustion zone 104$a$ as described further below.

Figures 5A, 5B, 5C:
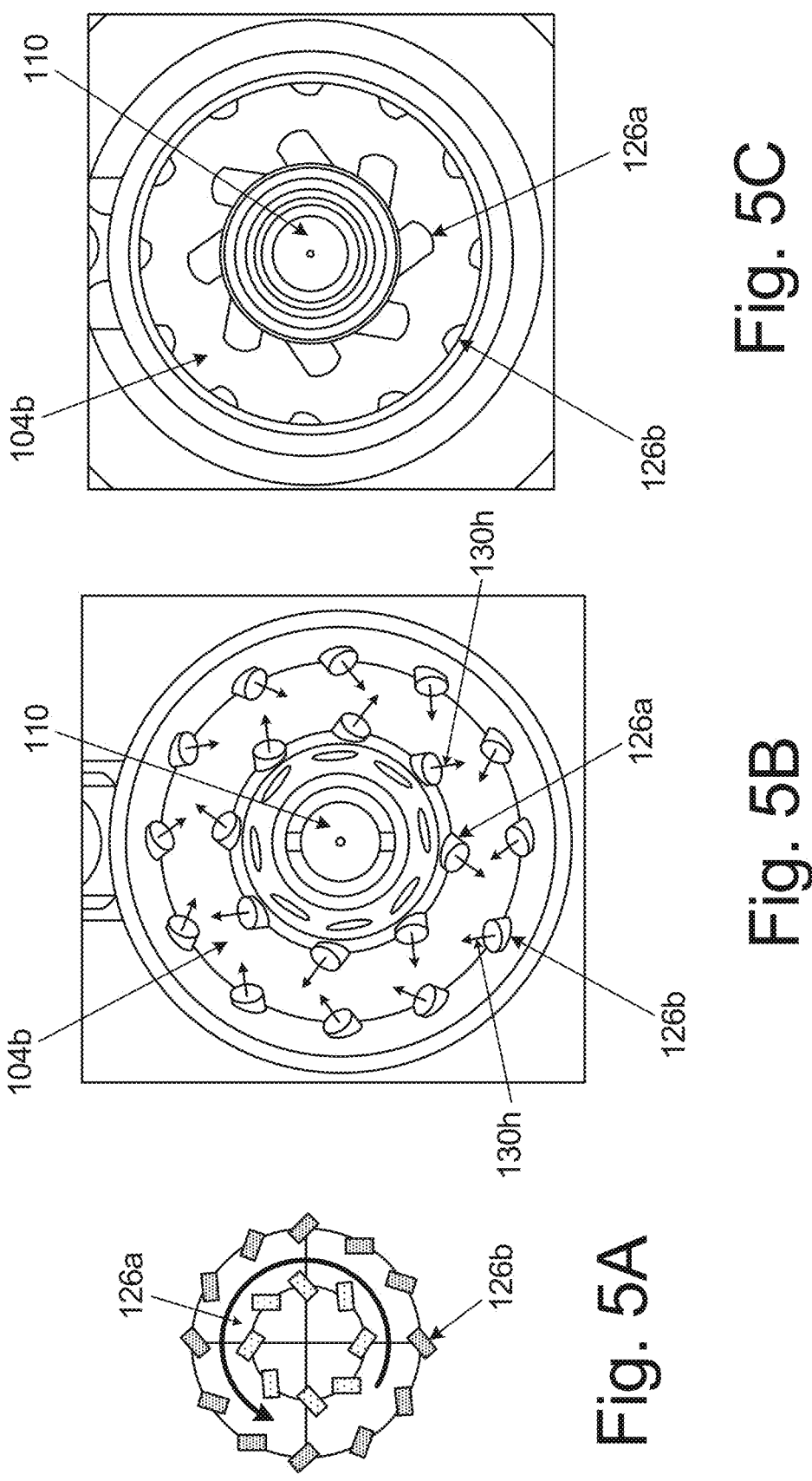
FIG. 5A is a schematic showing the arrangement of ID and OD quench tubes to create bulk swirl in the quench and lean zones of the combustor.
FIG. 5B is a downstream view (i.e., looking aft to front) of the arrangement of ID and OB quench tubes showing quench air flows exiting the ID and OD quench tubes.
FIG. 5C is an upstream view (i.e., looking front to aft) of the arrangement of ID and OD quench tubes.

FIGS. 5A-C, which will be discussed together, further illustrate the arrangement of the ID quench tubes 126$a$ and the OD quench tubes 126$b$. As discussed above, the quench zone 104$b$ of the combustor 104 is positioned downstream of the rich combustion zone 104$a$. The quench zone 104$b$ is configured as an annulus having a cross-section smaller than the height of the rich combustion zone 104$a$, forming a converging annulus that can accelerate combustion products from the rich combustion zone 104$a$ as they flow into the quench zone 104$b$ and mix with OD quench air 130$c$ from OD quench tubes 126$b$ and ID quench air 130$h$ from ID quench tubes 126$a$. FIG. 5A is a schematic showing the arrangement of ID and OD quench tubes 126$a$, 126$b$ to create bulk swirl in the quench 104$b$ and lean 104$c$ zones of the combustor 104. As shown in FIG. 5A, the ID and OD quench tubes 126$a$, 126$b$ are angled in the same direction around the quench zone 104$b$ to create the desired bulk swirl. While the ID and OD quench tubes 126$a$, 126$b$ can have any angle, it might be desirable for each of the ID and OD quench tubes 126$a$, 126$b$ to have the same angle. The angle for the ID and OD quench tubes 126$a$, 126$b$ can be selected to provide the desired bulk swirl and can also be selected to facilitate manufacturability. For example, if the ID and OD quench tubes 126$a$, 126$b$ will be formed using additive manufacturing techniques, it might be desirable to orient the ID and OD quench tubes 126$a$, 126$b$ at 45°, which is an angle that is convenient to make using additive manufacturing techniques.

FIG. 5B is a downstream view (i.e., looking aft to front along axis A of FIGS. 1, 2A and 2B 2) of the arrangement of ID and OB quench tubes 126$a$, 126$b$ showing quench air flows 130$c$, 130$h$ as they are received and directed by the ID and OD quench tubes 126$a$, 126$b$. Shaft 110 is shown as it passes through the combustor 104. FIG. 5C is an upstream view (i.e., looking front to aft along axis A of FIGS. 1, 2A and 2B) of the arrangement of ID and OD quench tubes 126$a$, 126$b$. While FIGS. 5A-5C show 8 ID quench nozzles 126$a$ and 12 OD quench tubes 126$b$, it should be understood that any number of ID quench tubes 126$a$ and OD quench tubes 126$b$ appropriate to create the desired bulk swirl through the quench zone 104$b$ and lean combustion zone 104$c$ can be used. Further, the positioning of the ID quench tubes 126$a$ and OD quench tubes 126$b$ can be selected to fluidically isolate the rich combustion zone 104$a$ from the rapid quench zone 104$b$. Additionally, it should be understood that the diameter, geometry, and other mechanical dimensions of the ID quench tubes 126$a$ and OD quench tubes 126$b$ should be selected to provide the desired bulk swirl through the quench zone 104$b$ and lean combustion zone 104$c$. As can be seen in FIGS. 5B and 5C, it may be desirable to angle the ID quench tubes 126$a$ and OD quench tubes 126$b$ downstream to entrain the unburned fuel and rich combustion zone 104$a$ products as they flow through the quench zone 104$b$ into the lean combustion zone 104$c$. Further, the geometry of the ID quench tubes 126$a$ and OD quench tubes 126$b$ can be selected to have a constant circular cross section, a decreasing cross section (i.e., a convergent nozzle), an increasing cross section (i.e., a divergent nozzle) for a single tube, all of the tubes, or any combination of the tubes depending on the requirements of a particular application. Appropriate selection of the number, spacing, angling, geometry, and mechanical dimensions of the ID quench tubes 126$a$ and OD quench tubes 126$b$ can be used to tailor the combustor 104 exit temperature and pattern factor (PF), which is defined as $PF=(T4_{peak}-T4_{avg})/T4_{avg}$ where T4 is the combustor 104 exit temperature. Typically, a lower pattern factor (i.e., even temperature distribution) is a desirable design criterion.

Figures 6A, 6C:
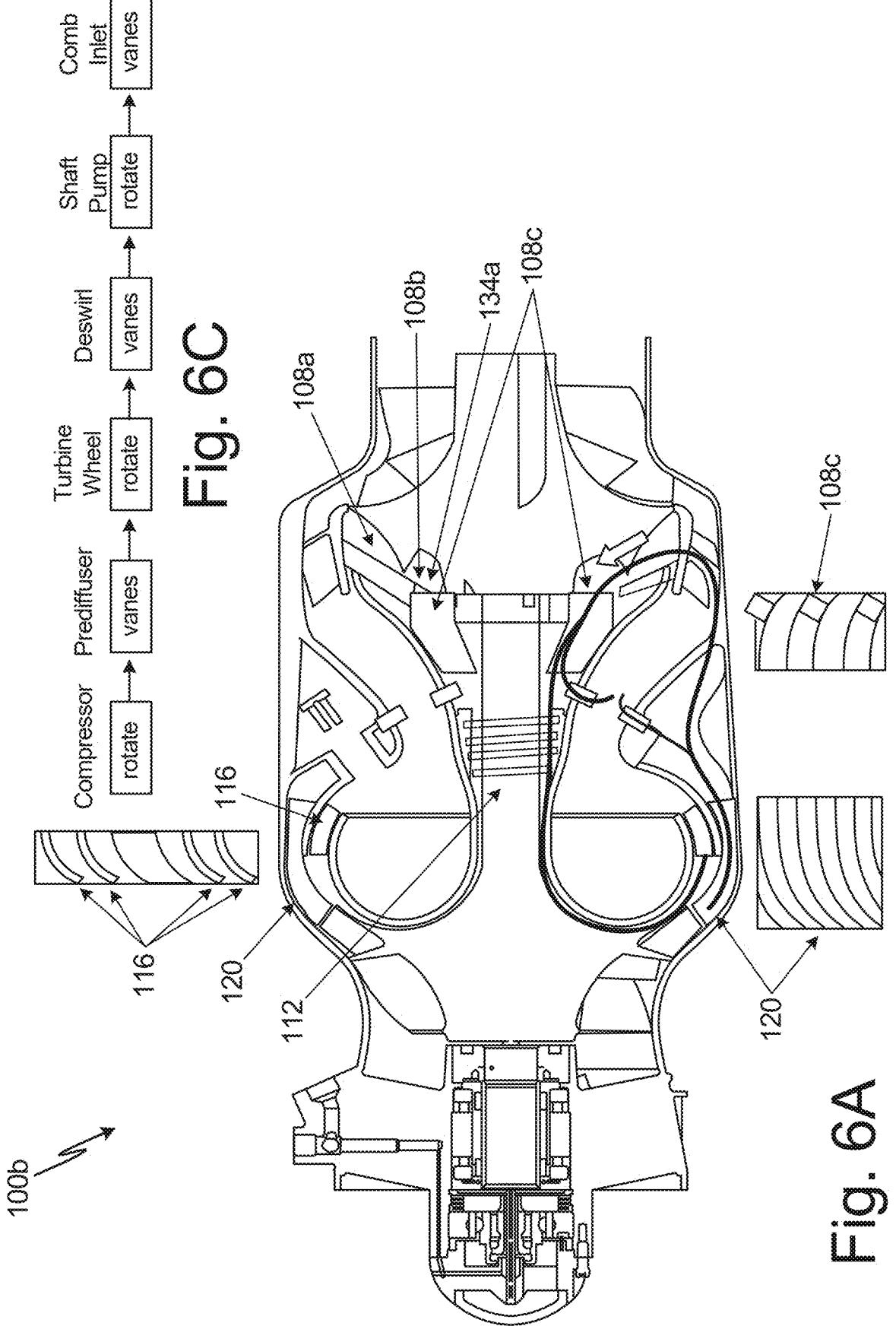
FIG. 6A is an alternate view of FIG. 2A showing the location and orientation of pre-diffuser deswirl channels and vanes, turbine wheel cooling air deswirl channels and vanes, and combustor inlet deswirl vanes.
FIG. 6C is a flow chart showing the progression of rotating and static portions of the engine.
Figure 6B:
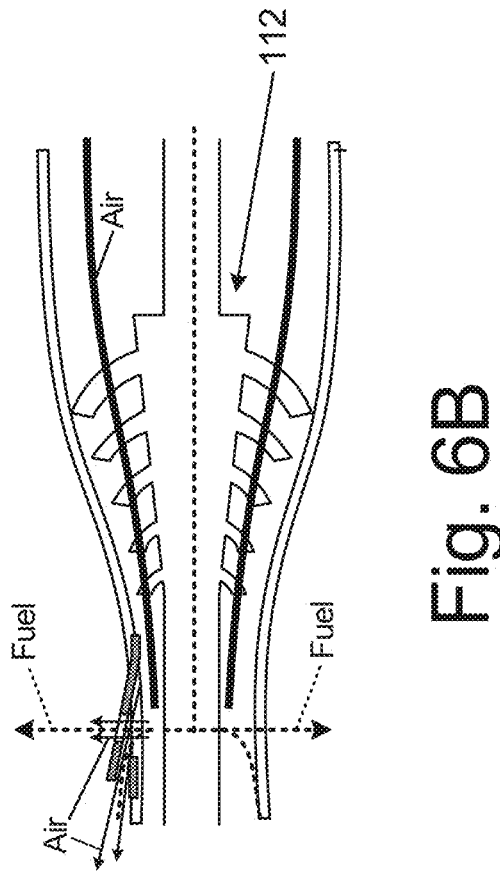
FIG. 6B is another view of the shaft cooling air pump of FIG. 6A depicting air and fuel flow.
Figures 7A, 7B, 7C, 7D, 7E, 7F:
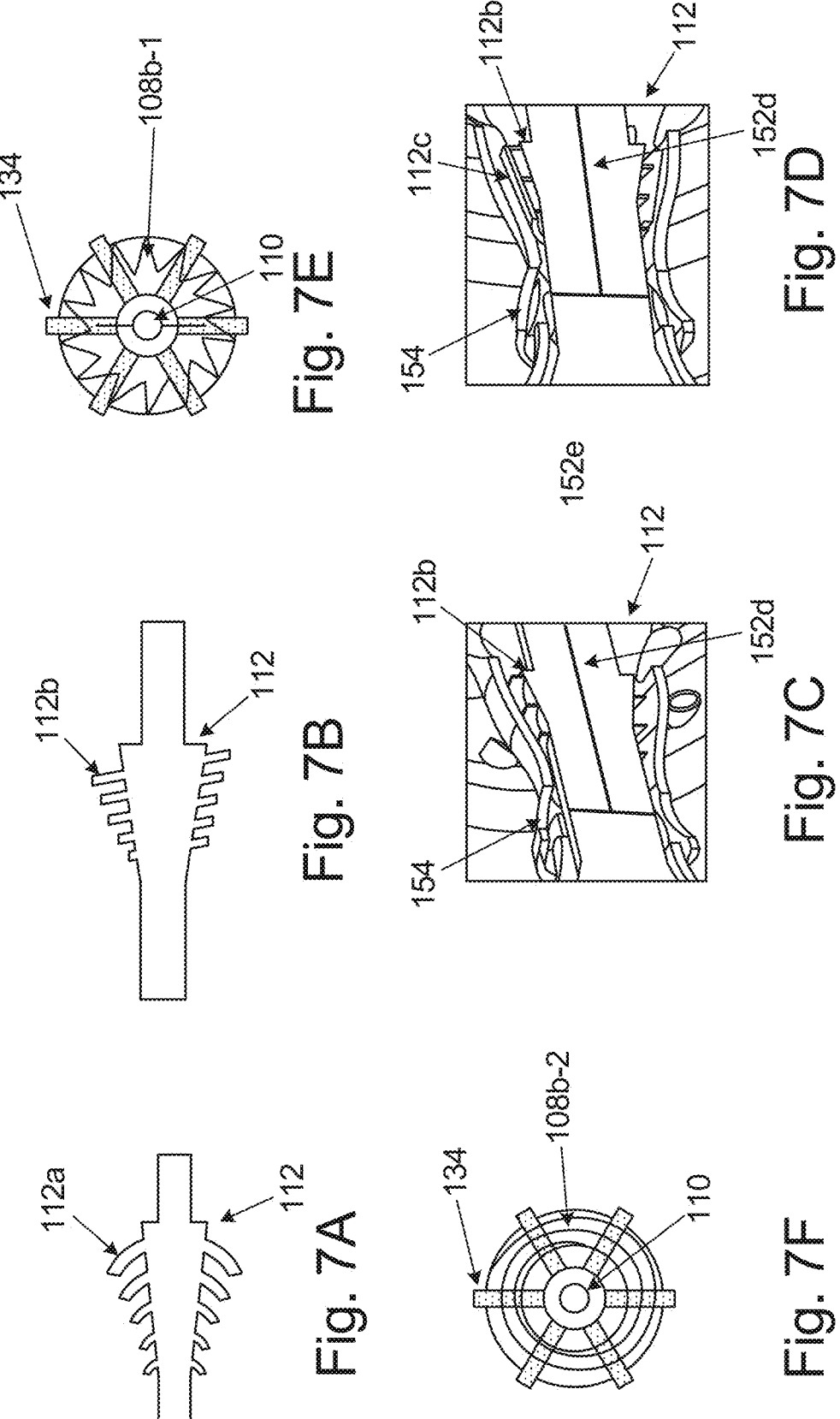
FIG. 7A is one example of a shaft cooling air pump of this disclosure.
FIG. 7B is another example of a shaft cooling air pump of this disclosure.
FIG. 7C is another view of the shaft cooling air pump of FIG. 6B.
FIG. 7D is another view of the shaft cooling air pump of FIG. 6B in which the pump threads are shrouded.
FIG. 7E is a third example of a shaft cooling air pump of this disclosure, including a turbine wheel with vanes to pump inner diameter combustor air.
FIG. 7F is a fourth example of a shaft cooling air pump of this disclosure, including a turbine wheel with helix scroll to pump inner diameter combustor air.

FIG. 6A is an alternate view of FIG. 2A showing additional features related to the supercharging (i.e., supplemental compression) of ID cooling air 130f. As discussed above, after providing cooling to the hollow cooled 1$^{st}$ stage turbine vanes 128, ID cooling air 130f flows into turbine air plenum 108a. In the example of FIG. 1, ID cooling air 130f provides ID combustor liner cooling air 130g and ID quench air 130 h before entering shaft cooling air pump 112. Shaft cooling air pump 112 can be any mechanical pump, such as the screw pump depicted in FIGS. 1, 2A, and 6A, that can further compress (i.e., further pressurize) cooling air to provide sufficient energy for the primary fuel injector air 130i, secondary fuel injector air 130j, and combustor secondary inlet air 130k to flow to their respective destinations as described above. In so doing, shaft cooling air pump 112 also provides suction to transport ID cooling air 130f to flow along the combustor 104 liner, hollow cooled 1$^{st}$ stage turbine vanes 128, and turbine air plenum 108a as described above. FIGS. 7A and 7B show two possible configurations for shaft cooling air pump 112 shaft cooling air pump 112 are possible as well. FIG. 7A shows shaft cooling air pump 112 with arched vanes 112a. FIG. 7B shows shaft cooling air pump 112 with straight screw threads 112b. FIG. 7C shows a perspective view of the shaft cooling air pump 112 of FIG. 7B. FIG. 7D is similar to FIG. 7C and shows the shaft cooling air pump 112 straight screw threads 112b with shrouds 112c, which are positioned on radially outboard tip of the straight screw threads 112b. The shrouds 112c are configured to maintain a desired velocity for the compressed air flowing through the cooling air flow path 124. Arched screw threads 112a, unshrouded or shrouded, or straight screw threads 112b, shrouded or unshrouded, or any other configuration can be selected to provide the desired additional compression for the cooling air. Also, the screw threads 112a, 112b can be configured to engage with the outer combustor liner wall 140b to cause the outer combustor liner wall 140b to function as an outer shroud for the screw threads 112a, 112b. The pitch of the screw threads 112a, 112b and rotational speed of the shaft 110 determine the flow rate of compressed air exiting the shaft cooling air pump 112. Further the configuration of the plurality of shaft cooling air pump 112 screw threads 112a, 112b can be selected to facilitate construction using additive manufacturing techniques. For example, arched screw threads 112a may be more amendable to construction using additive manufacturing techniques then straight threads 112b.

Returning to FIG. 6A, turbine wheel compression stage 108b can provide further supercharging (i.e., supplemental compression) of ID cooling air 130f in addition to that provided by shaft cooling air pump 112 or instead of that provided by shaft cooling air pump 112. Turbine wheel compression stage 108b can of any design that can provide supplemental compression of ID cooling air 130f flowing through turbine air plenum 108a. As shown in FIGS. 6A and 7E, the turbine wheel compression stage 108b can include a plurality of compression blades 108b-1 that are configured to rotate with the turbine 108 and compress ID cooling air 130f flowing through turbine air plenum 108a. The plurality of compression blades 108b-1 can be further configured to engage with a plurality of strut shrouds 134a positioned on the struts 134 to provide additional compression for ID cooling air 130f flowing through the turbine air plenum 108a. Alternately, as shown in FIG. 7F the turbine wheel compression stage 108b can be a scroll compressor 108b-2 that is configured to rotate with the turbine 108 and compress ID cooling air 130f flowing through turbine air plenum 108a. A person of ordinary skill will recognize that other options are available for turbine wheel compression stage 108b.

FIG. 6C is a flow chart showing the progression of rotating and static portions of the gas turbine engine 100a, 100b as a companion to FIG. 6A, which shows the location and orientation of pre-diffuser deswirl channels and vanes 120, turbine wheel cooling air deswirl channels and vanes 108c, and combustor inlet deswirl vanes 116. As known in the art, rotating stages in gas turbine engines, such as engines 100a, 100b, are typically followed by stationary vane stages to remove swirl imparted by the rotating stages. That is the function that the pre-diffuser deswirl channels and vanes 120, turbine wheel cooling air deswirl channels and vanes 108c, and combustor inlet deswirl vanes 116 that are depicted in FIG. 6A perform. As a secondary function, the pre-diffuser deswirl vanes 120 can be configured to provide further structural support for the combustor liner 140 in the rich combustion zone 104a.

Figures 8A, 8B, 8C, 8D:
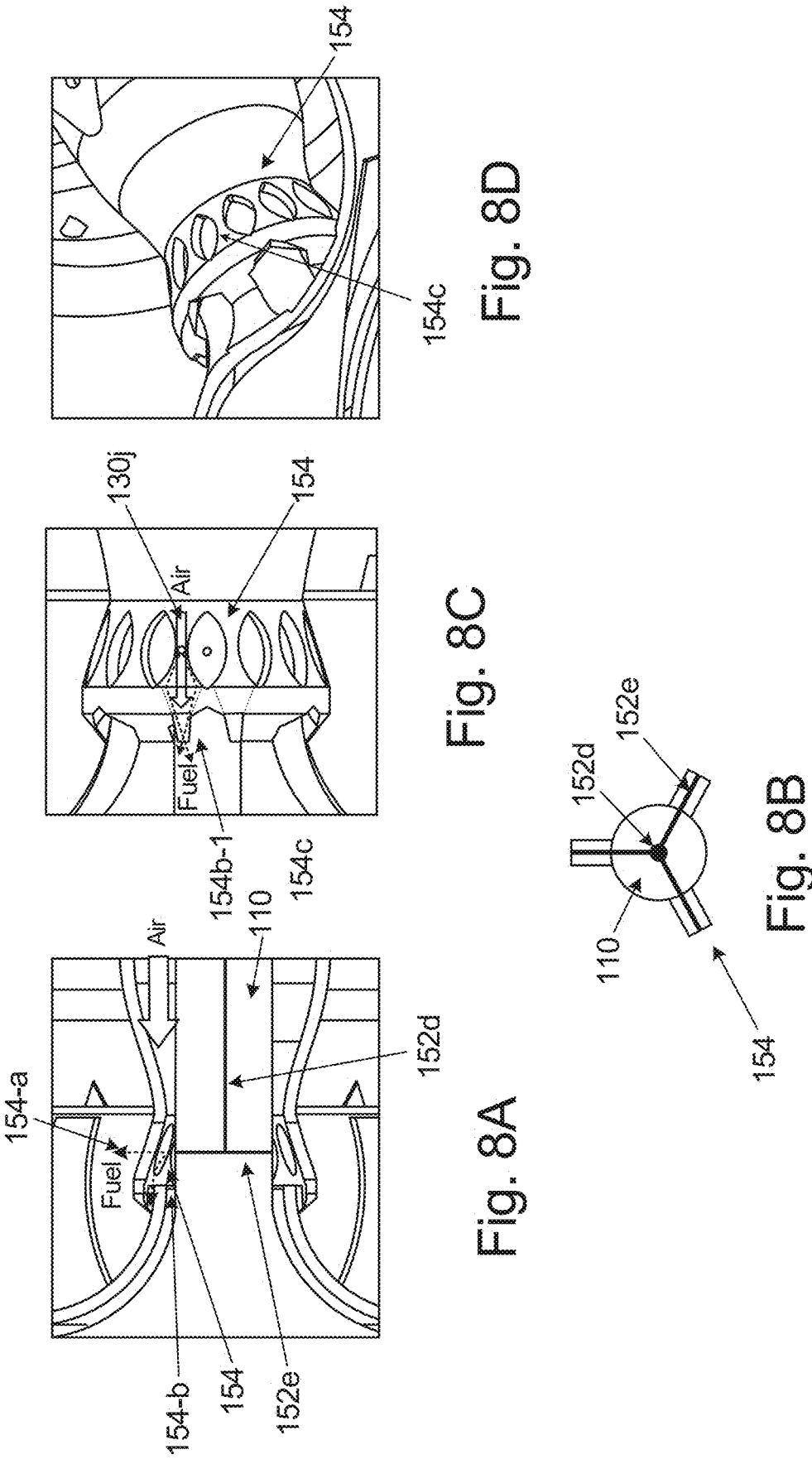
FIG. 8A is a schematic view a shaft fuel injection system.
FIG. 8B is a schematic view a shaft fuel injection system with multiple fuel orifices.
FIG. 8C is a more detailed schematic of the shaft fuel injection system.
FIG. 8D is perspective view of the shaft fuel injection system.

FIGS. 8A-D and 9A-F, which will be discussed together with FIG. 2A, further illustrate the fuel injector 154 and fuel and air flow through the fuel injector 154. As shown in FIGS. 2A and 2B, fuel enters the toroidal recirculation zone of the rich combustion zone 104a through the fuel injector 154 in two steams, a primary fuel flow 154a-1 which flows radially across the rich combustion zone 104a where it impinges on a "splash plate" portion of the combustor liner wall 154a-2 (i.e., part of the inner combustor liner wall 140a) and a secondary fuel flow 154b-1 which flows circumferentially along the combustor liner wall 154b-2 adjacent to and immediately downstream of the fuel injector 154. The fuel streams mix with the air and the remaining liquid fuel films and vaporize as they impinge on their respective portions of the combustor liner wall 154a-2, 154b-2 to form a combustible mixture with air in the rich combustion zone 104a. The flow of fuel and air in the toroidal recirculation zone, include primary fuel injector air 130i that enters with the primary fuel flow 154a-1 and secondary fuel injector air 130j that enters with the secondary fuel flow 154b-1, carriers fuel that films and vaporizes at the "splash plate" portion of the combustor liner wall 154a-2 toward the ignitor 118 where it ignites to support combustion in the rich combustion zone 104a. FIGS. 8A and 8B show more detailed schematics of the primary fuel flow 154a-1 and secondary fuel flow 154b-1 entering the rich combustion zone 104a. FIGS. 8C and 8D show an example of fuel injectors 154 having a lozenge-shaped opening, though opening of any other shape—particularly shapes suitable for construction using additive manufacturing techniques can be used. The fuel injected from the rotating shaft 152 enters the inner combustor liner wall 140a through apertures 154 in the inner combustor liner wall 140a and becomes primary fuel flow 154a-1 or hits the inner combustor liner wall 140a and is mixed with air through adjacent lozenge-shaped openings 154c that function as converging/diverging nozzles that accelerate secondary fuel injection air 130j as it mixes with the secondary fuel flow 154b-1.

FIGS. 9A-F show other illustrations of the fuel injector 154 and fuel and air flow and mixing through the fuel injector 154. FIG. 9A is an exemplary configuration that shows primary fuel flow 154a-1, primary fuel injector air 130i, secondary fuel flow 154b-1, and secondary fuel injector air 130j. FIG. 9B is another view of the fuel injector 154 of FIG. 9A "unwrapped" to show the plurality of primary fuel flows 154a-1, primary fuel injector air 130i flows, secondary fuel flows 154b-1, and secondary fuel injector air 130j flows. FIG. 9D shows an another exemplary configuration for the fuel injector 154, which can be described as an arch that forms a self-supporting wall that limits the amount of abutment material to prevent fuel blockage. FIGS. 9E-F show yet another exemplary configuration for the fuel injector 154, which can be described as an "stub" or "bump-out" to distribute the primary fuel flow 154a-1 closer to the "splash plate" portion of the combustor liner wall 154a-2.

Figure 10:
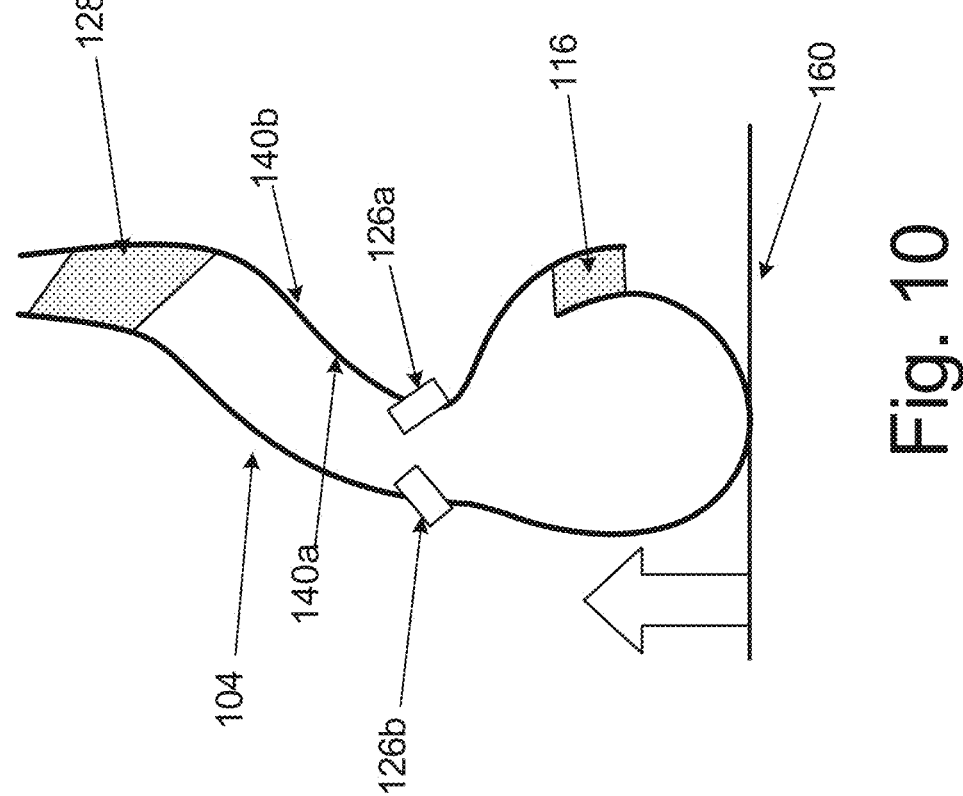
FIG. 10 is a schematic view of the combustor on an additive manufacturing build plate.

As discussed throughout this disclosure, various elements of the gas turbine engines 100a, 100b can be constructed with additive manufacturing techniques, including but not limited to Powder Bed Fusion-Laser/Electron Beam, Directed Energy Deposition, and other additive manufacturing techniques. As shown in FIG. 10, the combustor 104 described in this disclosure can be built "vertically" on an additive manufacturing build plate 160. Depending on the combustor 104 design and additive manufacturing technique selected, other features such as the combustor inlet deswirl vanes 116, ID and OD quench tubes 126a, 126b and hollow cooled 1$^{st}$ stage turbine vanes 128 can be made as part of the same build campaign as the combustor 104. The gas turbine engines 100a, 100b of this disclosure can be made from any materials appropriate for the desired application and selected manufacturing techniques, including additive manufacturing techniques.

The gas turbine engines described in this disclosure can be characterized as being useful for applications for which small size, high altitude relight capability, improved operability and lean blow out characteristics, and good operational life are desirable. In particular, the gas turbine engines of this disclosure have larger height recirculation zones to support altitude relight capabilities and flame stability. The arrangement of the combustor and integration of the ignitor into the combustor supports compact packaging that makes the gas turbine engines suitable for a number of applications for which previous designs were challenged. The use of supercharged combustor cooling promotes combustor durability and good airflow through the combustor. The integrated shaft fuel injection dispenses with the need for a separate fuel pump and contributes to the integration of the ignitor into a compact combustor package.

Discussion of Possible Embodiments

The following are non-exclusive descriptions of possible embodiments of the present invention.

A gas turbine engine includes a compressor configured to receive inlet air at a compressor inlet and generate compressed air at a compressor exit, a combustor positioned fluidically and physically downstream of the compressor, a turbine positioned fluidically and physically downstream of the combustor, and a shaft mechanically connecting the turbine and the compressor. The combustor is fluidically connected to the compressor to receive a first portion of the compressed air as combustor primary inlet air. The combustor includes a toroidal recirculation zone configured to receive and combust fuel in a rich combustion zone, an ignitor positioned to ignite an air/fuel mixture in the rich combustion zone, a rapid quench zone downstream of the toroidal recirculation zone, a lean combustion zone downstream of the rapid quench zone, and a cooling air flow path configured to direct a second portion of the compressed air around an outer combustor liner to cool the combustor liner and to provide a source of quench air, inner combustor liner cooling air, fuel injector air, and combustor secondary inlet air. The rapid quench zone, which includes an array of quench tubes, is configured to receive and quench with quench air combustion products from the rich combustion zone. The lean combustion zone is configured to complete combustion of the fuel and to generate hot combustor exhaust gas. The turbine is fluidically connected to the compressor to receive the hot combustor exhaust gas. The shaft, which connects the turbine to the compressor through an annulus formed by the combustor surrounding the shaft, is configured to transmit rotational energy from the turbine to the compressor to power the compressor pump fuel from a fuel source to the combustor through a fuel duct in the shaft. A shaft cooling air pump is configured to further compress and accelerate the second portion of the compressed air before the second portion of the compressed air enters the combustor as fuel injector air and combustor secondary inlet air. The toroidal recirculation zone further comprises a plurality of fuel injectors configured to mix fuel from the fuel duct in the shaft and fuel injector air from the shaft cooling air pump and to direct the fuel and the fuel injector air mixture into the rich combustion zone.

The gas turbine engine of the preceding paragraph can optionally include, additionally and/or alternatively, any one or more of the following features, configurations and/or additional elements:

The gas turbine engine of the preceding paragraph, wherein the plurality of fuel injectors are further configured to mix the fuel as a primary fuel flow with primary fuel injector air and as a secondary fuel flow with secondary fuel injector air.

The gas turbine engine of the preceding paragraph, wherein plurality of fuel injectors are further configured to: direct the primary fuel flow with primary fuel injector air radially across the rich combustion zone to impinge on a splash plate portion of the inner combustor liner upstream of the ignitor to cause the primary fuel flow to film and vaporize; and direct the secondary fuel flow with secondary fuel injector air circumferentially along the inner combustor liner adjacent to the plurality of fuel injectors to cause the secondary fuel flow to film and vaporize.

The gas turbine engine of any of the preceding paragraphs, wherein each of the plurality of fuel injectors have a lozenge-shaped opening with a slot between adjacent lozenge-shaped openings, wherein the slot is configured to function as a converging/diverging nozzle to accelerate secondary fuel injection air as it mixes with the secondary fuel flow.

The gas turbine engine of any of the preceding paragraphs, further comprising: a plurality of hollow 1st stage turbine vanes positioned between the combustor and the turbine; an aft bearing surrounding the shaft immediately upstream of the turbine, wherein the aft bearing is configured to provide structural support for the shaft when it rotates in operation; and a plurality of hollow struts positioned between the plurality of hollow 1st stage turbine vanes and the aft bearing, wherein the plurality of struts are configured to provide structural support for the aft bearing; wherein the fuel duct is configured to direct fuel through the plurality of hollow 1st stage turbine vanes, the plurality of hollow struts, and the aft bearing to provide cooling to the plurality of hollow 1st stage turbine vanes, the plurality of hollow struts, and the aft bearing when the engine is in operation.

The gas turbine engine of the preceding paragraph, wherein the fuel duct is further configured to thermally isolate the fuel from hot combustor gases as the fuel flows through at least one of the plurality of hollow 1st stage turbine vanes, at least one of the plurality of hollow struts, and the aft bearing when the engine is in operation.

A method of directing fuel to a combustor in a gas turbine engine includes rotating a shaft configured to mechanically connecting a turbine and a compressor to transmit rotational energy from the turbine to the compressor to power the compressor and pump fuel from a fuel source to the combustor through a fuel duct in the shaft. Fuel from the fuel duct is directed to a plurality of fuel injectors configured to mix the fuel from the fuel duct in the shaft and fuel injector air from a shaft cooling air pump. The fuel and the fuel injector air mixture is directed into a rich combustion zone of the combustor. The shaft connects the turbine to the compressor through an annulus formed by a combustor surrounding the shaft. The combustor further includes an ignitor positioned to ignite an air/fuel mixture in the rich combustion zone, a rapid quench zone downstream of the rich combustion zone, and a lean combustion zone downstream of the rapid quench zone. The rapid quench zone is configured to receive and quench with quench air combustion products from the rich combustion zone. The lean combustion zone is configured to complete combustion of the fuel and to generate hot combustor exhaust gas.

The method of the preceding paragraph can optionally include, additionally and/or alternatively, any one or more of the following features, configurations and/or additional elements:

The method of the preceding paragraph, further comprising mixing, with the plurality of fuel injectors, the fuel as a primary fuel flow with primary fuel injector air as a secondary fuel flow with secondary fuel injector air.

The method of the preceding paragraph, further comprising directing, with the plurality of fuel injectors, the primary fuel flow with primary fuel injector air radially across the rich combustion zone to impinge on a splash plate portion of the inner combustor liner upstream of the ignitor to cause the primary fuel flow to film and vaporize; and directing, with the plurality of fuel injectors, the secondary fuel flow with secondary fuel injector air circumferentially along the inner combustor liner adjacent to the plurality of fuel injectors to cause the secondary fuel flow to film and vaporize.

The method of any of the preceding paragraphs, further comprising accelerating secondary fuel injection air as it mixes with the secondary fuel flow as the secondary fuel injection air flows through a slot between adjacent lozenge-shaped openings in each of the plurality of fuel injectors, wherein the slot is configured to function as a converging/diverging nozzle.

The method of any of the preceding paragraphs, wherein the fuel duct is further configured to pass through: a plurality of hollow 1st stage turbine vanes positioned between the combustor and the turbine; an aft bearing surrounding the shaft immediately upstream of the turbine, wherein the aft bearing is configured to provide structural support for the shaft when it rotates in operation; and a plurality of hollow struts positioned between the plurality of hollow 1st stage turbine vanes and the aft bearing, wherein the plurality of struts are configured to provide structural support for the aft bearing; and directing the fuel, with the fuel duct, through the plurality of hollow 1st stage turbine vanes, the plurality of hollow struts, and the aft bearing to provide cooling to the plurality of hollow 1st stage turbine vanes, the plurality of hollow struts, and the aft bearing when the engine is in operation.

The method of the preceding paragraph, wherein the fuel duct is further configured to thermally isolate the fuel from hot combustor gases as the fuel flows through at least one of the plurality of hollow 1st stage turbine vanes, at least one of the plurality of hollow struts, and the aft bearing when the engine is in operation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
a compressor configured to receive inlet air at a compressor inlet and generate compressed air at a compressor exit;
a combustor positioned fluidically and physically downstream of the compressor,
   wherein the combustor is fluidically connected to the compressor to receive a first portion of the compressed air as combustor primary inlet air and wherein the combustor comprises:
   a toroidal recirculation zone configured to receive and combust fuel in a rich combustion zone;
   an ignitor positioned to ignite an air/fuel mixture in the rich combustion zone;
   a quench zone downstream of the toroidal recirculation zone, wherein the quench zone is configured to receive and quench with quench air combustion products from the rich combustion zone, wherein the quench zone includes an array of quench tubes;
   a lean combustion zone downstream of the quench zone, wherein the lean combustion zone is configured to complete combustion of the fuel and to generate hot combustor exhaust gas; and
   a cooling air flow path configured to direct a second portion of the compressed air around an outer combustor liner to cool the outer combustor liner and to provide a source of the quench air, inner combustor liner cooling air, fuel injector air, and combustor secondary inlet air;
a turbine positioned fluidically and physically downstream of the combustor, wherein the turbine is fluidically connected to the compressor to receive the hot combustor exhaust gas;
a shaft mechanically connecting the turbine and the compressor, wherein the shaft is configured to: transmit rotational energy from the turbine to the compressor to power the compressor, wherein the shaft connects the turbine to the compressor through an annulus formed by the combustor surrounding the shaft; and pump the fuel from a fuel source to the combustor through a fuel duct in the shaft; and
a shaft cooling air pump positioned in the cooling air flow path, wherein the shaft cooling air pump is configured to further compress and accelerate at least a portion of the second portion of the compressed air flowing through the cooling air flow path before the at least a portion of the second portion of the compressed air enters the combustor as the fuel injector air and the combustor secondary inlet air;
wherein the toroidal recirculation zone further comprises a plurality of fuel injectors configured to mix the fuel from the fuel duct in the shaft and the fuel injector air from the shaft cooling air pump to form the air/fuel mixture and to direct the air/fuel mixture into the rich combustion zone.

2. The gas turbine engine of claim 1, wherein the plurality of fuel injectors are further configured to mix the fuel as a primary fuel flow with primary fuel injector air of the fuel injector air and as a secondary fuel flow with secondary fuel injector air of the fuel injector air.

3. The gas turbine engine of claim 2, wherein plurality of fuel injectors are further configured to:

direct the primary fuel flow with the primary fuel injector air radially across the rich combustion zone to impinge on a splash plate portion of an inner combustor liner upstream of the ignitor to cause the primary fuel flow to film and vaporize; and direct the secondary fuel flow with the secondary fuel injector air circumferentially along the inner combustor liner adjacent to the plurality of fuel injectors to cause the secondary fuel flow to film and vaporize.

4. The gas turbine engine of claim 1, wherein each of the plurality of fuel injectors have a lozenge-shaped opening with a slot between adjacent lozenge-shaped openings, wherein the slot has a converging/diverging shape and accelerates the secondary fuel injection air as the secondary fuel injection air mixes with the secondary fuel flow.

5. The gas turbine engine of claim 1, further comprising:

a plurality of hollow 1$^{st}$ stage turbine vanes positioned between the combustor and the turbine;

an aft bearing surrounding the shaft immediately upstream of the turbine, wherein the aft bearing is configured to provide structural support for the shaft when the shaft rotates in operation; and a plurality of hollow struts positioned between the plurality of hollow 1st stage turbine vanes and the aft bearing, wherein the plurality of struts are configured to provide structural support for the aft bearing;

wherein the fuel duct is configured to direct the fuel through the plurality of hollow 1$^{st}$ stage turbine vanes, the plurality of hollow struts, and the aft bearing to provide cooling to the plurality of hollow 1$^{st}$ stage turbine vanes, the plurality of hollow struts, and the aft bearing when the gas turbine engine is in operation.

6. The gas turbine engine of claim 5, wherein the fuel duct is further configured to thermally isolate the fuel from the hot combustor exhaust gas as the fuel flows through at least one of the plurality of hollow 1$^{st}$ stage turbine vanes, at least one of the plurality of hollow struts, and the aft bearing when the gas turbine engine is in operation.

7. A method of directing fuel to a combustor in a gas turbine engine comprising:

rotating a shaft configured to mechanically connect a turbine and a compressor to:

transmit rotational energy from the turbine to the compressor to power the compressor, wherein the shaft connects the turbine to the compressor through an annulus formed by the combustor surrounding the shaft; and pump the fuel from a fuel source to the combustor through a fuel duct in the shaft; and directing the fuel from the fuel duct to a plurality of fuel injectors configured to mix the fuel from the fuel duct in the shaft and fuel injector air from a shaft cooling air pump to form an air/fuel mixture and to direct the air/fuel mixture into a rich combustion zone of the combustor, wherein the shaft cooling air pump is positioned in a cooling air flow path and the shaft cooling air pump is configured to further compress and accelerate at least a portion of compressed air from the compressor and flowing through the cooling air flow path before the at least a portion compressed air enters the combustor as the fuel injector air and as combustor secondary inlet air and wherein the combustor further comprises:

an ignitor positioned to ignite the air/fuel mixture in the rich combustion zone;

a quench zone downstream of the rich combustion zone, wherein the quench zone is configured to receive and quench with quench air combustion products from the rich combustion zone; and a lean combustion zone downstream of the quench zone, wherein the lean combustion zone is configured to complete combustion of the fuel and to generate hot combustor exhaust gas.

8. The method of claim 7, further comprising:

mixing, with the plurality of fuel injectors, the fuel as a primary fuel flow with primary fuel injector air of the fuel injector air as a secondary fuel flow with secondary fuel injector air of the fuel injector air.

9. The method of claim 8, further comprising:

directing, with the plurality of fuel injectors, the primary fuel flow with the primary fuel injector air radially across the rich combustion zone to impinge on a splash plate portion of an inner combustor liner upstream of the ignitor to cause the primary fuel flow to film and vaporize; and directing, with the plurality of fuel injectors, the secondary fuel flow with the secondary fuel injector air circumferentially along the inner combustor liner adjacent to the plurality of fuel injectors to cause the secondary fuel flow to film and vaporize.

10. The method of claim 7, further comprising accelerating secondary fuel injection air of the fuel injection air as the secondary fuel injection air mixes with the secondary fuel flow as the secondary fuel injection air flows through a slot between adjacent lozenge-shaped openings in each of the plurality of fuel injectors, wherein the slot has a converging/diverging shape.

11. The method of claim 7, wherein the fuel duct is further configured to pass through:

a plurality of hollow 1$^{st}$ stage turbine vanes positioned between the combustor and the turbine;

an aft bearing surrounding the shaft immediately upstream of the turbine, wherein the aft bearing is configured to provide structural support for the shaft when the shaft rotates in operation; and a plurality of hollow struts positioned between the plurality of hollow 1$^{st}$ stage turbine vanes and the aft bearing, wherein the plurality of struts are configured to provide structural support for the aft bearing; and directing the fuel, with the fuel duct, through the plurality of hollow 1$^{st}$ stage turbine vanes, the plurality of hollow struts, and the aft bearing to provide cooling to the plurality of hollow 1$^{st}$ stage turbine vanes, the plurality of hollow struts, and the aft bearing when the gas turbine engine is in operation.

12. The method of claim 11, wherein the fuel duct is further configured to thermally isolate the fuel from the hot combustor exhaust gas as the fuel flows through at least one of the plurality of hollow 1$^{st}$ stage turbine vanes, at least one of the plurality of hollow struts, and the aft bearing when the gas turbine engine is in operation.

* * * * *